T. S. MOFFETT.
HARNESS.
APPLICATION FILED MAY 26, 1910.
972,897.
Patented Oct. 18, 1910.
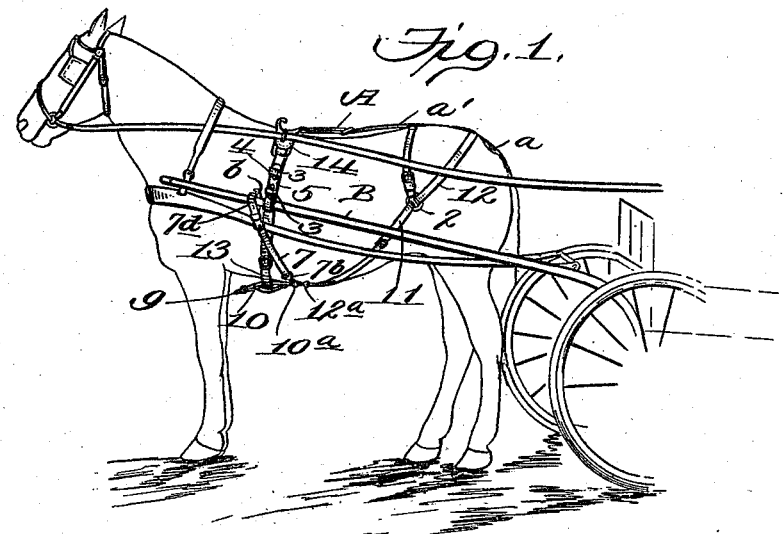
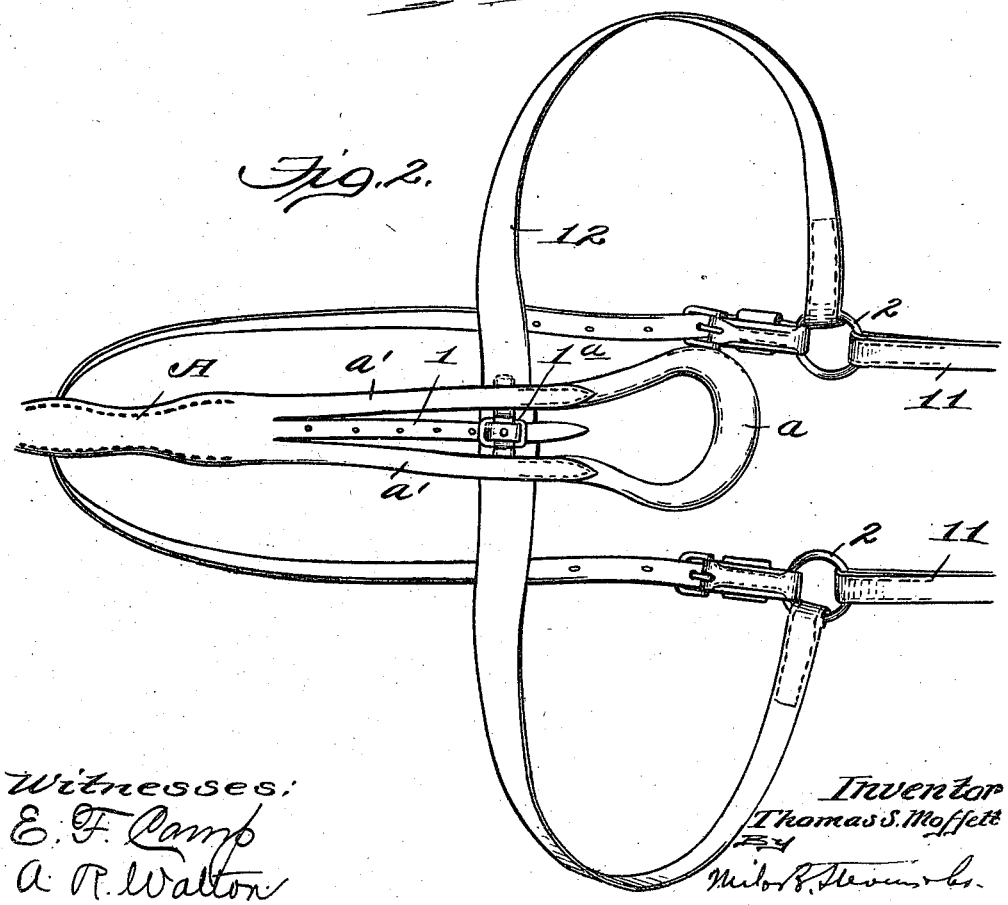
Witnesses:
E. F. Camp
A. R. Walton
Inventor
Thomas S. Moffett
By
Milo B. Stevens & Co.
Attys

UNITED STATES PATENT OFFICE.

THOMAS S. MOFFETT, OF SPOKANE, WASHINGTON.

HARNESS.

972,897. Specification of Letters Patent. Patented Oct. 18, 1910.

Application filed May 26, 1910. Serial No. 563,511.

*To all whom it may concern:*

Be it known that I, THOMAS S. MOFFETT, a citizen of the United States, residing at Spokane, in the county of Spokane and State of Washington, have invented certain new and useful Improvements in Harnesses, of which the following is a specification.

My invention relates to harness for various uses, my object being to provide certain improvements therein so that a horse may be more readily and easily released from a vehicle than with the harness at present used.

With this in view my invention resides in the details to be hereinafter described with reference to the accompanying drawings, in which—

Figure 1 is a view showing the practical application of my improved harness, and Fig. 2 is a perspective view of a portion thereof.

Referring now to these figures, I have shown the crupper $a$ as integrally connected to extensions $a'$, at the rear end of the back band A. The rear end of this back band is split longitudinally to form the said extensions $a'$ and to form an integral tongue 1 which is apertured and constitutes an adjusting strap to adjustably engage the buckle $1^a$ secured to the breeching 12 which, in accordance with my improvements, and in order to fasten, as stated, to the back band, passes over the rump of the animal upon which the harness is to be used. This breeching has intermediate rings 2, forming means with which to connect the ends of the adjustable hip strap 11, and the forward ends thereof extend under the animal's belly and have snap-hooks $12^a$ which are brought together and connected upon a ring $10^a$ at the rear end of a connecting strap 10, the latter having an intermediate loop through which the belly band 13 passes to support the same. This strap 10 may also have a forward ring 9 to snap on an extra strap to reach the breast-yoke (not shown) when using two horses.

The hold-back straps 7 are formed at one end with loops $7^d$ adapted to be passed over the shafts B and to engage rearwardly against projections $b$ of said shafts. The opposite ends of said straps 7 have snap-hooks $7^b$ adapted to be engaged with ring $10^a$ at the ends of the breeching. These straps 7 thus serve to hold the shafts down and prevent the vehicle (not shown) from crowding upon the animal.

The saddle 14 is provided with side straps 5, extending therefrom, the free ends of which have a series of apertures engageable upon buttons 4 and adapted to be passed around the shafts B at the rear of projections $b$ and through loops 3 before engagement with said buttons 4.

From the foregoing it will be seen that I provide a simple and improved harness whereby an animal may be readily and quickly removed from a vehicle, as it is only necessary to release the saddle straps 5 in addition to releasing the traces.

I claim:

1. The combination of a back band split adjacent its rear end to form side extensions and a tongue between said extensions, and a breeching having a buckle secured thereto, said tongue being apertured to engage said buckle.

2. The combination of hold-back straps having loops formed at one end and connecting members at the opposite end, a back-band, a breeching adjustably connected to said back band and having connecting members at its forward end, and a connection to receive the members of the hold-back straps and the breeching.

In testimony whereof I affix my signature in presence of two witnesses.

THOMAS S. MOFFETT.

Witnesses:
  THOS. HYE,
  F. M. VINCENT.